(12) United States Patent
Liao

(10) Patent No.: US 6,666,242 B1
(45) Date of Patent: Dec. 23, 2003

(54) WOOD PLANING MACHINE WITH A HEIGHT DISPLAY UNIT

(76) Inventor: Juei-Seng Liao, No. 295, Sec. 1, Nanking E. Rd., Taichung (TW)

(*) Notice: Subject to any disclaimer, the term of this patent is extended or adjusted under 35 U.S.C. 154(b) by 0 days.

(21) Appl. No.: 10/408,611

(22) Filed: Apr. 7, 2003

(30) Foreign Application Priority Data

Jan. 24, 2003 (TW) ..................... 92201413 U

(51) Int. Cl.⁷ .............. B27C 1/00; B23Q 16/00
(52) U.S. Cl. ............ 144/130; 144/117.1; 144/382; 144/430; 144/356; 250/559.29; 409/210; 409/214
(58) Field of Search ............ 144/114.1, 116.1, 144/117.1, 129, 130, 356, 357, 382, 402, 404, 430; 250/559.29; 409/210, 214, 218; 451/8, 9, 28, 302

(56) References Cited

U.S. PATENT DOCUMENTS

| | | | | |
|---|---|---|---|---|
| 6,279,628 B1 | * | 8/2001 | Chang | 144/130 |
| 6,308,754 B1 | * | 10/2001 | Chang | 144/117.1 |
| 6,474,378 B1 | * | 11/2002 | Ryan et al. | 144/154.5 |
| 6,510,879 B1 | * | 1/2003 | Chuang | 144/130 |
| 2001/0051492 A1 | * | 12/2001 | Donahue | 451/8 |

* cited by examiner

Primary Examiner—W. Donald Bray
(74) Attorney, Agent, or Firm—Trop, Pruner & Hu, P.C.

(57) ABSTRACT

A wood planing machine includes a base, screw rods mounted rotatably on and extending from the base, a cutter carriage mounted movably on the screw rods, and a detecting unit including a light transmitter and a light receiver that cooperates with the light transmitter to define a gap therebetween and that generates an electrical signal upon receiving light from the light transmitter. An optical encoder wheel is fixed to one of the screw rods, and is formed with a plurality of angularly spaced apart holes. The optical encoder wheel extends into the gap.

3 Claims, 5 Drawing Sheets

WOOD PLANING MACHINE WITH A HEIGHT DISPLAY UNIT

CROSS REFERENCE TO RELATED APPLICATION

This application claims priority of Taiwan Application No. 92201413, filed on Jan. 24, 2003.

BACKGROUND OF THE INVENTION

1. Field of the Invention

The invention relates to a wood planing machine, more particularly to a wood planing machine with a height display unit for a cutter carriage.

2. Description of the Related Art

Referring to FIG. 1, a conventional wood planing machine is shown to include a machine body 10, left and right pairs of hollow posts 122, left and right pairs of screw rods 121, a cutter carriage 13, and a height display unit 15.

As illustrated, the machine body 10 has a base 11. The left and right pairs of screw rods 121 are mounted rotatably on the base 11 of the machine body 10. The hollow posts 122 are sleeved around the screw rods 121. The cutter carriage 13 is disposed above the base 11, and is mounted on the left and right pairs of hollow posts 122. The cutter carriage 13 threadedly engages left and right pairs of screw rods 123 (not visible) in such a manner that rotation of the screw rods 123 results in movement of the cutter carriage 13 along the hollow posts 122. The height display unit 15 includes a measuring scale mounted vertically on one of the hollow posts 122. A turning wheel 14 is fixed to the top end of one of the screw rods 121 to facilitate turning of the screw rods 121.

The aforesaid conventional wood planing machine is disadvantageous in that it is tiresome and inconvenient to read the scale of the height display unit 15 during the planing operation. In addition, human error in reading the scale of the height display unit 15 is likely to occur.

SUMMARY OF THE INVENTION

Therefore, the object of this invention is to provide a wood planing machine with a height display unit, which can overcome the aforementioned disadvantages of the prior art.

Accordingly, a wood planing machine of the present invention includes: a machine body having a base; a plurality of spaced apart screw rods extending uprightly in a longitudinal direction from and mounted rotatably on the base; a cutter carriage mounted movably on the screw rods so that rotation of the screw rods results in movement of the cutter carriage in the longitudinal direction; a detecting unit mounted on the machine body and including a light transmitter and a light receiver that cooperates with the light transmitter to define a gap therebetween and that generates an electrical signal upon receiving light from the light transmitter; an optical encoder wheel fixed to one of the screw rods so as to be co-rotatable therewith, having a peripheral end, and formed with a plurality of angularly spaced apart holes in the peripheral end, the peripheral end of the optical encoder wheel extending into the gap in such a manner that light emitted from the light transmitter is received by the light receiver only through the holes; and a control unit mounted on the machine body and electrically connected to the detecting unit for receiving the electrical signal from the light receiver and for calculating the number of revolutions of said one of the screw rods and the height of the cutter carriage relative to the base during rotation of the screw rods.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
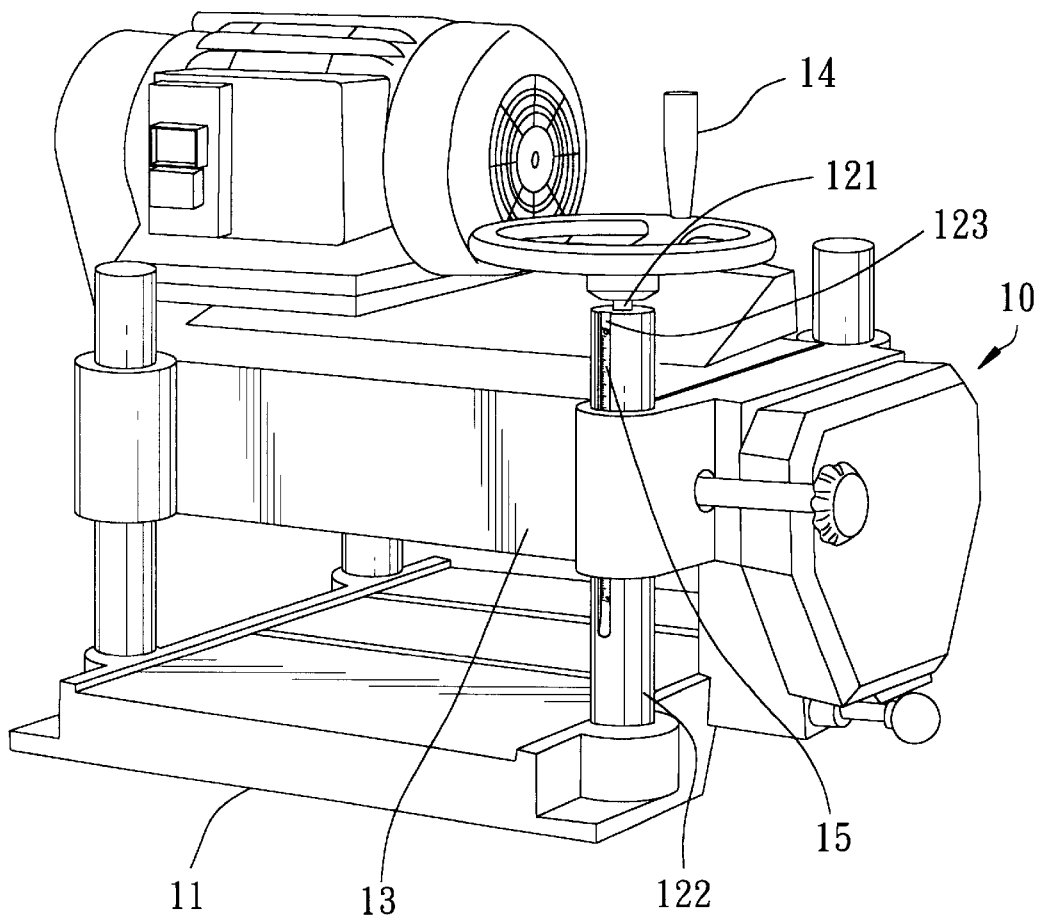
FIG. 1 is a perspective view of a conventional wood planing machine incorporating a height display unit for a cutter carriage.
Figure 2:
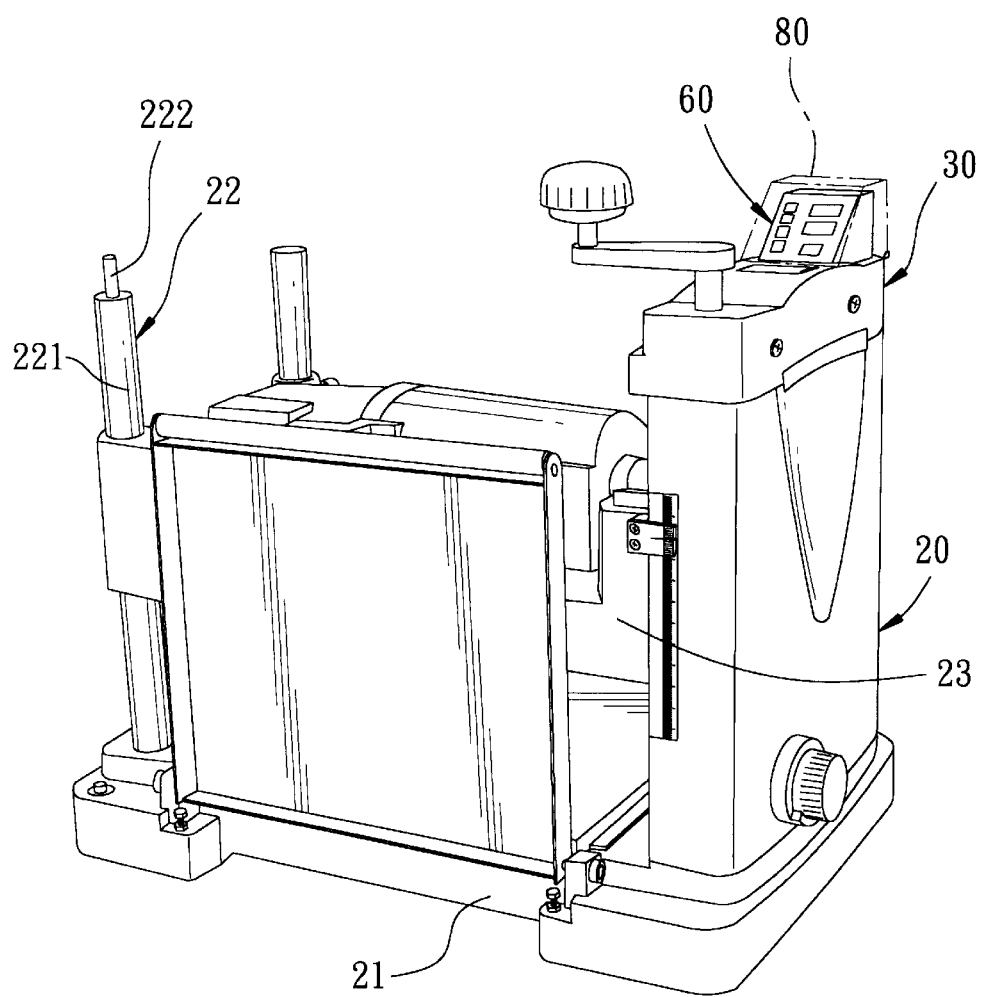
FIG. 2 is a perspective view of the preferred embodiment of a wood planing machine according to the present invention which incorporates a height display unit for a cutter carriage.
Figure 3:
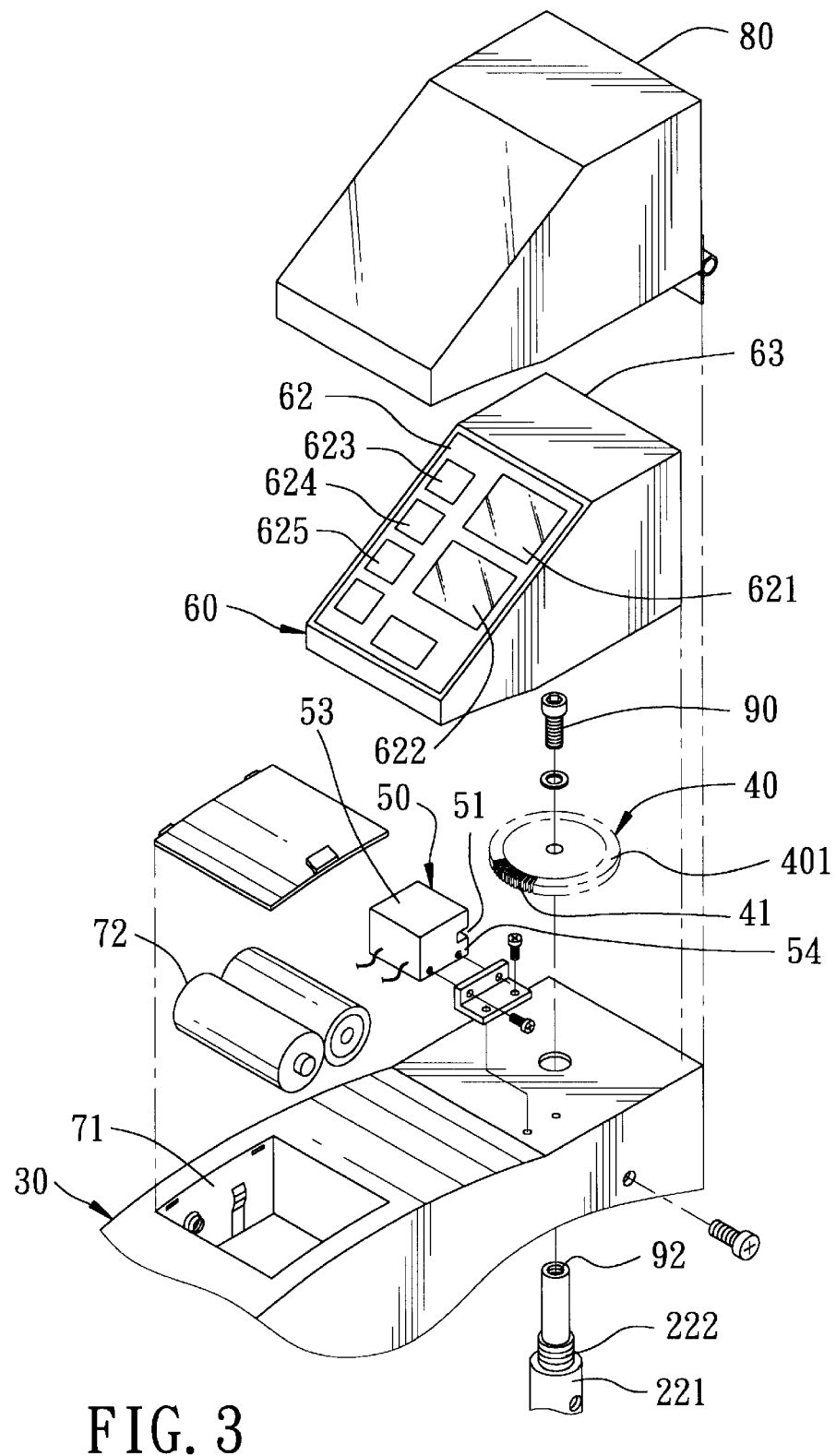
FIG. 3 is a fragmentary perspective view of the preferred embodiment, illustrating how the height display unit is mounted on a machine body of the preferred embodiment.
Figure 4:
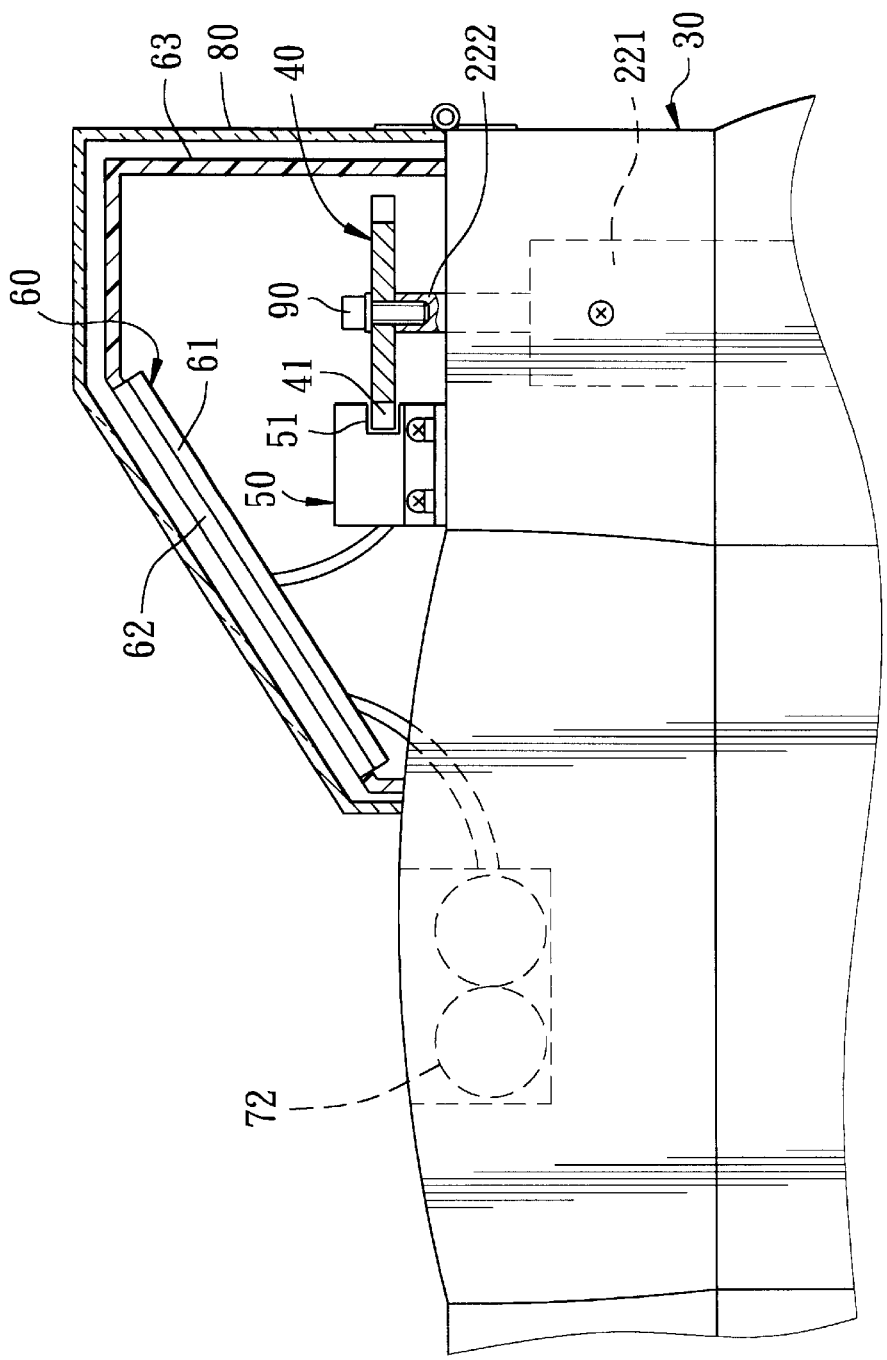
FIG. 4 is a fragmentary sectional side view of the preferred embodiment.

Referring to FIGS. 2 to 4, the preferred embodiment of a wood planing machine according to the present invention is shown to include a machine body 20, left and right pairs of hollow posts 221, left and right pairs of screw rods 222, a cutter carriage 23, and a height display unit.

As illustrated, the machine body 20 has a mounting base 21. The left and right pairs of screw rods 222 are mounted rotatably on the base 21 of the machine body 20. The left and right pairs of hollow posts 221 extend in a longitudinal direction from the base 21, and are sleeved around the left and right pairs of screw rods 222.

The cutter carriage 23 is disposed above the base 21, and has opposite end portions mounted respectively and movably on the left and right pairs of hollow posts 221 and engaging threadedly the screw rods 222 in such a manner that rotation of the screw rods 222 within the hollow posts 221 results in movement of the cutter carriage 23 along the hollow posts 221. A cutter unit (not visible) is mounted on the cutter carriage 23 for planing a wooden workpiece disposed on the base 21 and below the cutter carriage 23.

The height display unit includes a housing 30 mounted securely on the right side of the base 21, a detecting unit 50 mounted in the housing 30, an optical encoder wheel 40, and a control unit 60. The optical encoder wheel 40 is fixed to one of the screw rods 222, which extends into the housing 30, so as to be co-rotatable therewith. Said one of the screw rods 222 has a top end formed with an internal thread 92. A fastening screw member 90 extends through a hole in the optical encoder wheel 40 to engage threadedly the internal thread 92 in the top end of said one of the screw rods 222 so as to secure the optical encoder wheel 40 on said one of the screw rods 222. The detecting unit 50 includes a light transmitter 53 and a light receiver 54 that cooperates with the light transmitter 53 to define a gap 51 therebetween. The light receiver 54 generates an electrical signal upon receiving light from the light transmitter 53. The optical encoder wheel 40 has a peripheral end 401, and is formed with a plurality of angularly spaced apart holes 41 in the peripheral end 401. The peripheral end 401 of the optical encoder wheel 40 extends into the gap 51 between the light transmitter 53 and the light receiver 54 in such a manner that light emitted from the light transmitter 53 is received by the light receiver 54 only through the holes 41. The control unit 60 is mounted in the housing 30, and is electrically connected to the detecting unit 50 for receiving the electrical signal from the light receiver 53 and for calculating the number of revolutions of the screw rods 222 and the height of the cutter carriage 23 relative to the base 21 of the machine body 20 during rotation of the screw rods 222.

The control unit 60 includes a circuit board 61 that is mounted on a display-mounting part 63 of the housing 30, and that is electrically connected to the light receiver 54 and a battery unit 72 for processing the electrical signal from the light receiver 54. The battery unit 72 is received in a battery-receiving recess 71 in the housing 30. The control unit 60 further includes a display panel unit 62 that is electrically connected to the circuit board 61 and that includes a first display panel 621 for displaying a first value that corresponds to the height of the cutter carriage 23 relative to the base 21 and that represents the thickness of the workpiece (not shown) disposed on the base 21 when the cutter carriage 23 rests on the workpiece, and a second display panel 622 for displaying a second value that corresponds to the thickness of the portion of the workpiece which is removed by planing. The display panel unit 62 further includes first and second reset keys 623,624 for respectively resetting the first and second values as shown on the first and second display panels 621,622 to zero. A unit-converting key 625 is installed on the display panel unit 62 for switching the unit as shown on the first and second display panels 621,622 between centimeters and inches.

Figure 5:
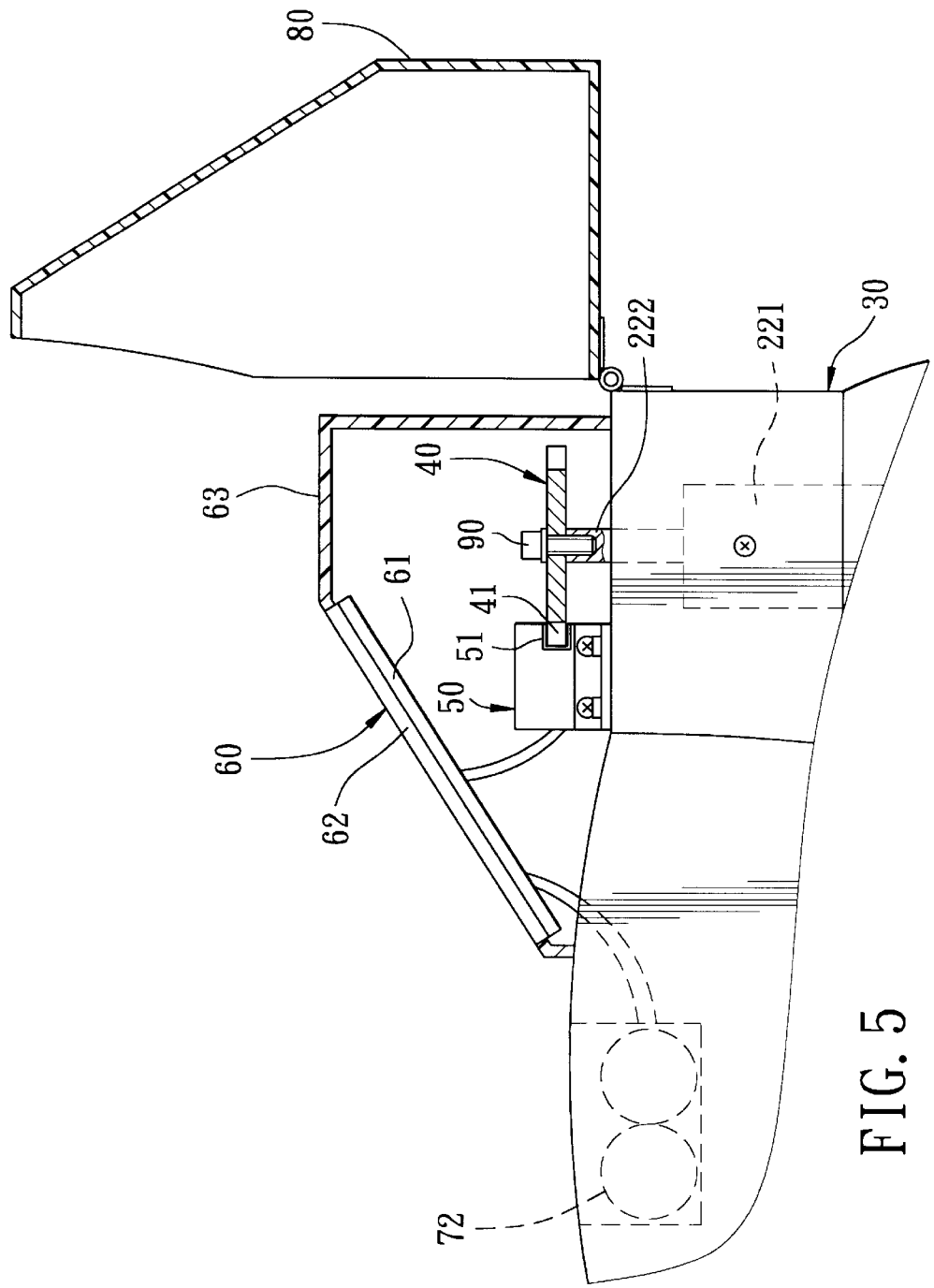
FIG. 5 is a fragmentary side view of the preferred embodiment, in which a protective casing is lifted to expose the height display unit.

Preferably, a transparent protective casing 80 is provided to cover the display unit 62. FIG. 5 illustrates a position of the protective casing 80 when lifted to expose the display panel unit 62.

With the provision of the height display unit on the wood planing machine of the present invention, the aforesaid disadvantages of the prior art can be overcome accordingly.

With this invention thus explained, it is apparent that numerous modifications and variations can be made without departing from the scope and spirit of this invention. It is therefore intended that this invention be limited only as indicated in the appended claims.

I claim:

1. A wood planing machine comprising:

a machine body including a base;

a plurality of spaced apart screw rods extending uprightly in a longitudinal direction from and mounted rotatably on said base;

a cutter carriage mounted movably on said screw rods so that rotation of said screw rods results in movement of said cutter carriage in said longitudinal direction;

a detecting unit mounted on said machine body and including a light transmitter and a light receiver that cooperates with said light transmitter to define a gap therebetween and that generates an electrical signal upon receiving light from said light transmitter;

an optical encoder wheel fixed to one of said screw rods so as to be co-rotatable therewith, having a peripheral end, and formed with a plurality of angularly spaced apart holes in said peripheral end, said peripheral end of said optical encoder wheel extending into said gap in such a manner that light emitted from said light transmitter is received by said light receiver only through said holes; and a control unit mounted on said machine body and electrically connected to said detecting unit for receiving the electrical signal from said light receiver and for calculating the number of revolutions of said one of said screw rods and the height of said cutter carriage relative to said base during rotation of said screw rods.

2. The planing machine as defined in claim 1, further comprising a fastening screw member, said one of said screw rods having a top end that is formed with an internal thread, said optical encoder wheel being fixed to said top end of said one of said screw rods through engagement between said fastening screw member and said internal thread.

3. The planing machine as defined in claim 1, wherein said control unit includes a display panel unit for displaying the height of said cutter carriage relative to said base.

* * * * *